United States Patent [19]

Tordoff

[11] Patent Number: 4,716,732
[45] Date of Patent: Jan. 5, 1988

[54] VEHICLE HYDRAULIC ACTUATING SYSTEM

[75] Inventor: Robert L. Tordoff, Huntertown, Ind.

[73] Assignee: Navistar International Transportation Corp., Chicago, Ill.

[21] Appl. No.: 733,561

[22] Filed: May 10, 1985

[51] Int. Cl.⁴ .............................................. B60T 11/30
[52] U.S. Cl. ........................................ 60/584; 60/546; 60/585
[58] Field of Search ................. 60/584, 591, 592, 583, 60/585

[56] References Cited

U.S. PATENT DOCUMENTS

| | | | |
|---|---|---|---|
| 2,156,415 | 5/1939 | Weihe | 60/584 |
| 2,378,409 | 6/1945 | Joy. | |
| 2,397,270 | 3/1946 | Kelly | 60/584 |
| 2,524,544 | 10/1950 | Seawell | 60/584 |
| 2,531,705 | 11/1950 | Schultz. | |
| 2,540,879 | 2/1951 | Hebel et al. . | |
| 2,882,686 | 4/1959 | Griffith. | |
| 2,890,708 | 6/1959 | Wise et al. . | |
| 2,997,849 | 8/1961 | Shimanckas | 60/584 |
| 3,075,355 | 1/1963 | Baker. | |
| 3,406,519 | 10/1968 | Hackett | 60/584 |
| 3,892,166 | 7/1975 | Johansson | 91/454 |
| 3,967,447 | 7/1976 | Hegel | 60/572 |
| 4,174,615 | 11/1979 | Kuhn | 60/584 |

Primary Examiner—Abraham Hershkovitz
Attorney, Agent, or Firm—F. David AuBuchon; Dennis K. Sullivan

[57] ABSTRACT

A master-slave hydraulic control system preferably for actuating a vehicle clutch utilizes single-acting hydraulic cylinders which are both connected to a fluid reservoir. The higher mounted cylinder has a bleed valve in the line connecting that cylinder with the fluid reservoir. The lower mounted cylinder is connected to the fluid reservoir via a check valve. The check valve allows fluid communication between the reservoir and the lower cylinder when the pressure within that cylinder is below a predetermined value. The hydraulic system may be bled regardless of the position of extension of either cylinder.

8 Claims, 4 Drawing Figures

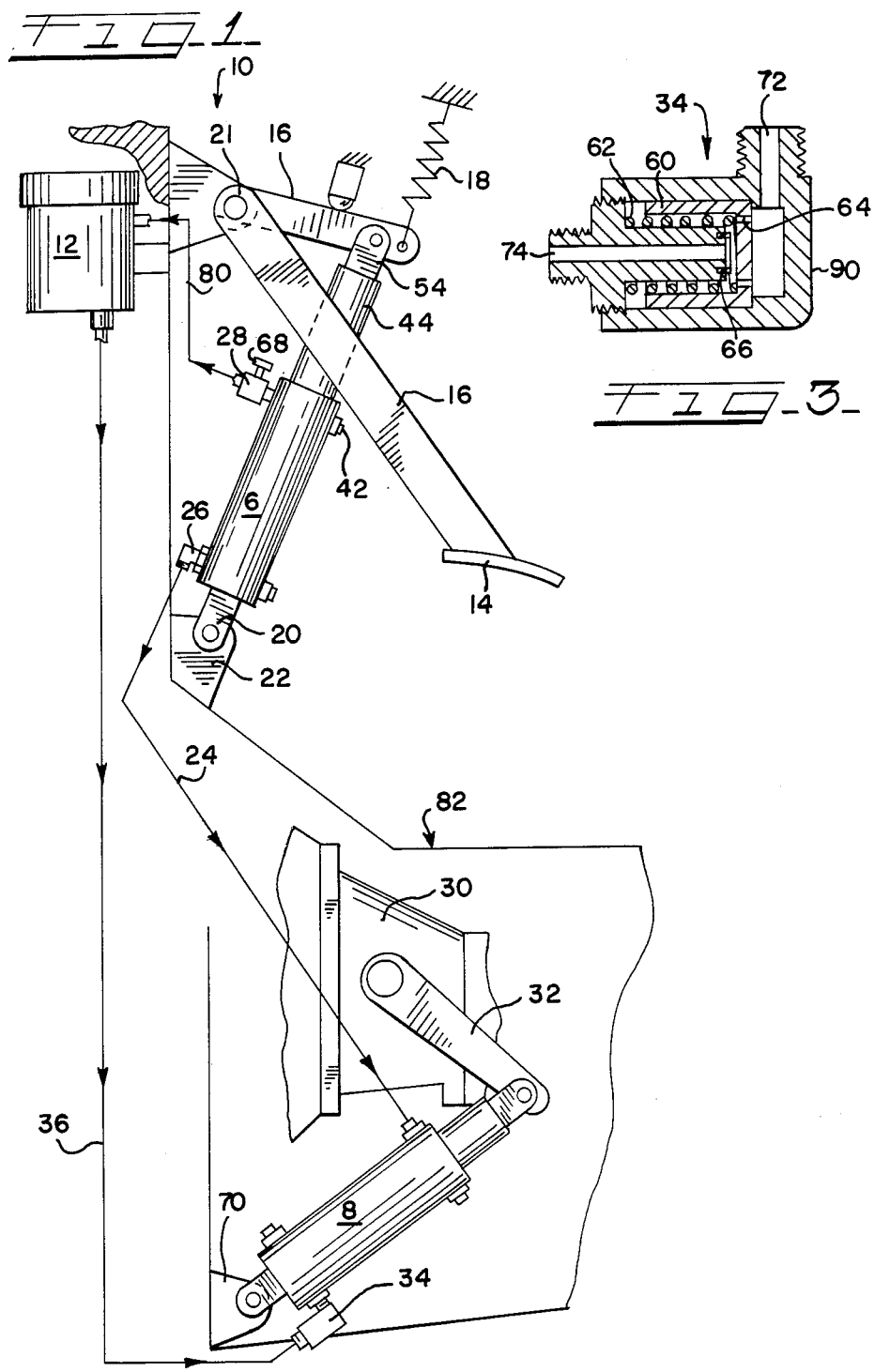

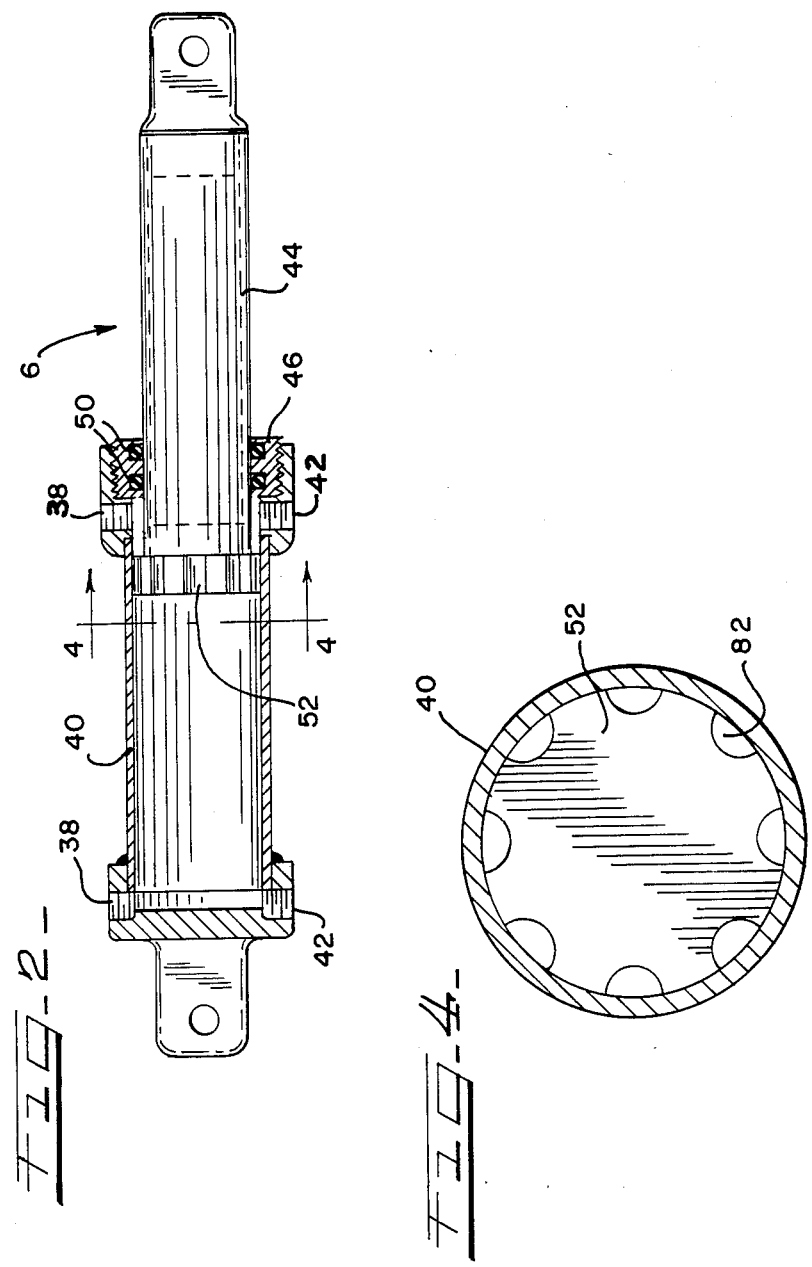

VEHICLE HYDRAULIC ACTUATING SYSTEM

BACKGROUND OF THE INVENTION

The field of the present invention is that of manually actuated master-slave hydraulic actuating systems and hydraulic cylinders used therein. More particularly, the field of the present invention is that of pedal force actuated hydraulic actuating systems as for the clutch of a motor vehicle transmission.

DISCLOSURE STATEMENT

Large motor vehicles such as trucks often have a pedal actuated master-slave hydraulic system to control the engagement and release of the vehicle's transmission clutch. A clutch pedal within the operator cab is mechanically linked with the master cylinder. The master cylinder is fluidly connected with the slave cylinder which operates the clutch release mechanism. The clutch release mechanism and slave cylinder are usually located underneath the cab. Similar systems are used to actuate vehicle brakes.

One type of master cylinder which can be utilized in a clutch control system is a fixed mount hydraulic cylinder with a pivoting push rod. The push rod pivots allowing it to be more easily connected to the clutch pedal.

Fixed mount hydraulic cylinders with pivoting push rods present a number of problems in vehicle clutch control applications. One problem is that feasible master cylinder locations are limited by the need to preserve the proper cylinder elevation required for proper operation. Design and installation choices are restricted by limitations on the push rod angularity. Another problem associated with pivoting push rod cylinders is that they are prone to installation and service maladjustments (such as the master cylinder not being fully retracted). The aforementioned misadjustments may result in improper clutch release or clutch slippage and wear. Still another problem associated with pivoting push rod cylinders is accelerated wear on the cylinder piston resultant from the side thrust caused by the push rod's angularity.

An alternative to the hydraulic clutch control system utilizing a fixed mount pivoting rod cylinder is described in Hegel U.S. Pat. No. 3,967,447. Hegel discloses a pedal actuated master-slave hydraulic actuating circuit for a vehicle clutch, which also has a fluid reservoir communicable with the hydraulic circuit. An internal valve within the hydraulic cylinders, responsive to preselected movement of the hydraulic piston, controls the fluid communication of the cylinders with the fluid reservoir.

To provide for improved hydraulic system purging, the slave cylinder of Hegel is also connected to the fluid reservoir. There are several undesirable features associated with the hydraulic actuating system of Hegel. Hegel requires a hydraulic cylinder with a complex piston head which incorporates a valve mechanism. When the slave cylinder of Hegel is connected to the fluid reservoir, the hydraulic system must pump out the fluid within the rod side of the slave cylinder, whenever the slave cylinder is acutated. To fully bleed (purge) the slave cylinder of Hegel, the slave cylinder must be fully extended in order to actuate the piston head valve, thereby allowing the fluid reservoir to communicate with the interior of the slave cylinder on both sides of the piston head. Since the slave cylinder is underneath the cab of the truck, gaining access thereto increases the difficulty of bleeding. Also, the slave cylinder must be unlatched from the clutch level before the slave cylinder may be fully extended. It is apparent to those skilled in the art that this is a time consuming operation due to the inaccessibility of the slave cylinder from the operator's cab area and the unlatching operation.

SUMMARY OF THE INVENTION

To overcome the disadvantages of prior master-slave hydraulic actuating systems for vehicle clutches and like systems, the present invention is brought forth. The present invention is a master-slave hydraulic actuating system. The upper mouonted cylinder, typically the master cylinder, is fluidly connected to the slave cylinder. Both cylinders are fluidly connected with a fluid reservoir. The slave cylinder is also pressure regulated to prevent flow out of the slave cylinder when the slave cylinder is actuated, thereby preventing pumping losses by pumping fluid from the slave cylinder back into the fluid reservoir. The hydraulic actuating system is bled by simply manually opening a bleed valve which connects the master cylinder with the fluid reservoir. The bleed valve can be mounted within the vehicle cab allowing easy access to the vehicle operator. Complete purging of the system may be effectuated regardless of the degree of extension of any of the hydraulic cylinders including the slave cylinder.

Alternatively, the master cylinder may be located below the slave cylinder, so long as the uppermost cylinder is fluidly connected via the bleed valve to the fluid reservoir and the lowermost cylinder is fluidly connected to the reservoir via a check valve.

The present invention also allows the use of simple single acting cylinders without complex piston head or cylinder valving. The master and slave cyinders are essentially identical lending the system to greater economics of manufacture.

It is an object of the present invention to provide a master-slave hydraulic actuating system wherein the slave cylinder is connected to the fluid reservoir without incurring the energy loss of pumping out the slave cylinder to the reservoir. It is an object of the present invention to provide a master-slave hydraulic actuating system which allows bleeding of the hydraulic system regardless of the degree of extension of the master or slave cylinders. It is a desire of the present invention to provide a master-slave hydraulic actuating system which allows manual bleeding. It is an object of the present invention to provide a master-slave hydraulic actuating system wherein the master and slave cylinder are essentially identical and do not require complex interior valving. It is a desire of the present invention to provide a hydraulic system with a working stroke that may begin at any point within the cylinder. It is a desire of the present invention to provide a hydraulic system which may be bled without fluid loss outside of the system.

Other objects, desires, and advantages of the present invention will become apparent to those skilled in the art as the nature of the invention is better understood from the accompanying drawings and detail description.

BRIEF DESCRIPTION OF THE DRAWINGS

FIG. 1 is a side elevational view of the inventive hydraulic actuating system;

FIG. 2 is a sectional view of a hydraulic cylinder utilized in FIG. 1;

FIG. 3 is a side elevational view in section of a check valve utilized in FIG. 1; and FIG. 4 is a section view of the hydraulic cylinder illustrated in FIG. 2 taken along the line 4—4.

DETAILED DESCRIPTION OF THE DRAWINGS

Referring to FIG. 1 the hydraulic actuating system of the present invention has three major hydraulic components, master cylinder 6, slave cylinder 8 and reservoir 12. Master cylinder 6 is fluidly connected with the slave cylinder 8 via hydraulic line 24. Reservoir 12 via fluid lines 80 and 36 is fluidly connected with the master cylinder 6 and the slave cylinder 8 respectively.

Master cylinder 6 is pivotably mounted to a truck cab mounting piece 22 and is also pivotably attached to a linkage member 16 pivoted to the cab as at 21. Linkage member 16, which is used as an actuator for master cylinder 6, has at its end a foot pedal 14. A spring 18 biases a cylinder ram 44 in an extended direction. Extension 20 and 54 provides means of attachment of master cylinder shell 40 and ram 44 to the cab mounting piece 22 and the linkage 16 respectively.

Slave cylinder 8, mounted below the cab floor 82, is pivotably attached to the truck structure 70 and to a clutch linkage arm 32. Clutch linkage arm 32 controls the engagement and release of the truck transmission clutch 30. Slave cylinder 8 is hydraulically connected to the reservoir line 36 via a spring biased check valve 34.

Referring to FIGS. 2 and 4 cylinder 6 (essentially identical to cylinder 8) has the cylinder ram 44 slideably mounted within the elongated cylinder shell 40. At an end of the ram 44 is an attached guide ring 52 which provides the support and alignment for the ram 44 within the cylinder shell 40. Guide ring 52 separates the interior of the cylinder shell 40 into two separate chambers. However, the guide ring 52 has a series of perforations 82 which allow the free flow of fluid on both sides of the guide ring 52. In the embodiment illustrated in FIGS. 2 and 4 the guide ring 52 is attached to the ram 44, however, it need not be but may merely surround the ram 44. The cylinder 6 is closed on its ram end by a threadably insertable end cap 46. End cap 36 along its inner periphery has a series of O-rings 50 which sealably surround the ram 44.

Shell 40 has at each of its two opposite ends a cylinder port 38. Since the hydraulic cylinder 6 is a single acting cylinder, either cylinder port may be utilized in connecting the cylinder, and the actual cylinder port utilized will be determined by installation requirements and or cylinder orientation. Also, the cylinder ports 38 disposed on either side of the guide ring 52, allow the cylinder to serve as a conduit for the hydraulic system.

The cylinder port 38 is chosen from a group of axially aligned radially spaced apertures. At the ends of cylinder shell 40, two additional apertures 42 are illustrated. Typically shell 40 will be manufactured with two or more apertures at each end and the aperture used for the cylinder port will be determined upon installation of the hydraulic cylinder. A standard hydraulic fitting 26 (as illustrated in FIG. 1) may be inserted into any of the desired apertures and the remaining apertures will be sealed with a plug. By providing a plurality of available cylinder ports, the orientation of the cylinder during installation will be more tolerant of any needed adjustments.

Referring to FIG. 3, the check valve 34 has a passage 72 leading to the slave cylinder and another passage 74 leading to the reservoir via fluid line 36. Within check valve shell 90, spring 62 biases the piston 60 to the right, therefore allowing unrestricted flow between the passage 74 to the passage 72 via passage 64. When the pressure within the slave cylinder 8 reaches a predetermined value sufficient to overcome spring 62, the piston 64 will be urged to the left to mate with the valve seat 66 shutting off the flow between valve passages 74 and 72. At the deactuation of the slave cylinder, the pressure within the slave cylinder will lower to a point such that spring 62 will overcome the pressure acting upon piston 60 thereby pushing the piston 60 rightwardly and reconnecting valve passages 74 and 72. Therefore the spring biased check valve 34 will only allow fluid communication between the reservoir 12 and the slave cylinder 8 when the pressure within the slave cylinder 8 is below a predetermined value. Since the purpose of the spring 62 is to insure that the valve 34 will be open when the control system is not in use, the predetermined pressure value will be quite small compared to the operating pressures in the cylinder.

In bleeding the system, a handle 68 of the bleed valve 28 will be opened, allowing the hydraulic system 10 to be filled with hydraulic fluid. Since the slave cylinder 8 is not actuated, check valve 34 will also be opoen to the reservoir. Any entrapped air will be allowed to escape via the bleed valve 28 (which is connected to he cylinder port of highest elevation) or through the reservoir line 36 (which is connected to the cylinder port of lowest elevation) regardless of the extension of master cylinder 6 or slave cylinder 8.

After initial infill, bleed valve 28 which is usually located in the operator cab, is manually shut off. In normal operation, to release the clutch 30, the operator pushes downward on the pedal 14 which via linkage 16 overcomes the force of spring 18, and forces ram 44 downward to actuate the master cylinder 6. The actuation of the master cylinder 6 forces fluid through fluid line 24 into the slave cylinder 8 causing the clutch lever 32 to pivot and release clutch 30. Upon the initial actuation of slave cylinder 8, check valve piston 64 is pushed leftward shutting off fluid communication between the cylinder 8 and the reservoir 12 thereby, preventing the pumping of the fluid within the slave cylinder 8 into reservoir 12.

Upon release of the foot pedal 12, the spring 18 will pull the ram 44 back to a extended position, thereby relieving the pressure within slave cylinder 8, and allowing clutch lever 32 to return and bring the clutch 30 back to an engaged position. Upon a decrease of fluid pressure within the slave cylinder 8, the check valve 34 will again reopen allowing fluid communication between the reservoir 12 and the slave cylinder 8.

If it is desired to have the slave cylinder at an elevation higher than that of the master cylinder the hydraulic system will still function. The only modification which will be required is that the check valve be on the cylinder port of lowest elevation of the hydraulic system (master cylinder) and the bleeder valve be maintained on the cylinder port of highest elevation (slave cylinder).

While a few embodiments of the present invention have been explained, it will be readily apparent that those skilled in the art that other modifications can be made to the present invention without departing from the spirit and scope of this application as it is encompassed by the following claims. For example, the manual valve 28 might be replaced by a second spring-biased check valve 34. Theoretically, this would produce a system which would self-bleed whenever the pedal was at rest since a continuous passage would exist from the reservoir through both cylinders and back to the reservoir in this position.

What is claimed is:

1. A hydraulic actuating system for a mechanical element comprising:
    a single-acting master cylinder having a ram and at least one cylinder port at a first elevation, said master cylinder ram being biased in a first direction;
    acturator means for moving said master cylinder ram in a second direction opposite said first direction and generating fluid pressure in said master cylinder;
    a single-acting slave cylinder with at least one cylinder port at a second lower elevation, said slave cylinder having fluid communication with said master cylinder and said slave cylinder controlling said mechanical element; and
    a fluid reservoir having selective fluid communication with said cylinder port of said first elevation for bleeding said hydraulic actuating system, said reservoir having automatic fluid communication with said cylinder port of said second lower elevation when the fluid pressure within said cylinder port of said second lower elevation is at least zero but below a predetermined value and no fluid communication when the fluid pressure within said cylinder port of said second lower elevation is greater than said predetermined value and further comprising a spring biased check valve disposed between said cylinder port of said second lower elevation and said reservoir and disposed to prevent flow from said slave cylinder ot said reservoir upon said slave cylinder being pressurized while being biased to permit flow when said slave cylinder is unpressurized.

2. A hydraulic actuating system as described in claim 1 wherein said actuator means includes a mechanical linkage and foot pedal.

3. A hydraulic actuating system as described in claim 2 further including said mechanical linkage having spring means to bias said master cylinder ram in said first direction.

4. A hydraulic actuating system as described in claim 1 further including a bleeder valve establishing fluid communication with said reservoir and said master cylinder during a bleeding process while preventing comunication during normal operation of the actuating system.

5. The hydraulic actuating system of claim 4 and said bleeder valve comprising a manual shutoff valve.

6. A hydraulic actuating system for a motor vehicle clutch comprising:
    a single-acting master cylinder having a ram and at least one cylinder port at a first elevation, said master cylinder being biased in a first direction;
    pedal associated actuator means for moving said master cylinder ram in a second direction opposite said first direction and generating fluid pressure in said master cylinder;
    a single-acting slave cylinder with at least one cylinder port at a second lower elevation, said slave cylinder having fluid communication with said master cylinder and with said slave cylinder controlling said vehicle clutch; and
    a fluid reservoir having selective fluid communication with said cylinder port of said first elevation for bleeding said hydraulic actuating system, said reservoir having automatic fluid communication with said cylinder port of said second lower elevation when there is no exteriorly applied fluid pressure within said cylinder port of said second lower elevation and no fluid communication when the pressure in said cylinder port is of said second lower elevation is greater than a predetermined value and further comprising a spring biased check valve disposed between said cylinder port of said second lower elevation and said reservoir to prevent flow to said reservoir from said slave cylinder upon said slave cylinder being pressurized and biased to permit flow thereto upon said slave cylinder being unpressurized.

7. A hydraulic system in accordance with claim 6 further including a manual valve operatively disposed between said cylinder port of highest elevation and said reservoir, said manual valve being open for bleeding and closed for system operation.

8. A hydraulic actuating system as described in claim 7 wherein both of said cylinders are elongated having cylinder ports at each end and said master cylinder is located above said slave cylinder.

* * * * *